(12) United States Patent
Lee

(10) Patent No.: US 12,224,581 B2
(45) Date of Patent: Feb. 11, 2025

(54) BIDIRECTIONAL CONVERTER AND CONTROL METHOD THEREOF

(71) Applicants: Hyundai Motor Company, Seoul (KR); Kia Corporation, Seoul (KR)

(72) Inventor: Ho Joong Lee, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 93 days.

(21) Appl. No.: 18/099,190

(22) Filed: Jan. 19, 2023

(65) Prior Publication Data

US 2024/0072536 A1 Feb. 29, 2024

(30) Foreign Application Priority Data

Aug. 23, 2022 (KR) .................. 10-2022-0105689

(51) Int. Cl.
| | |
|---|---|
| *H02J 7/34* | (2006.01) |
| *B60L 50/60* | (2019.01) |
| *B60L 58/12* | (2019.01) |
| *B60L 58/18* | (2019.01) |
| *H02J 1/08* | (2006.01) |
| *H02J 7/00* | (2006.01) |
| *H02M 1/00* | (2006.01) |

(52) U.S. Cl.
CPC .............. *H02J 1/084* (2020.01); *B60L 50/60* (2019.02); *B60L 58/12* (2019.02); *B60L 58/18* (2019.02); *H02J 7/0047* (2013.01); *H02J 7/0063* (2013.01); *H02J 7/00712* (2020.01); *H02M 1/0067* (2021.05); *H02J 2207/20* (2020.01)

(58) Field of Classification Search
None
See application file for complete search history.

(56) References Cited

U.S. PATENT DOCUMENTS

| | | | |
|---|---|---|---|
| 2019/0391557 A1* | 12/2019 | Volkovich | G05B 19/41875 |
| 2022/0065946 A1* | 3/2022 | Kwon | B60L 58/20 |
| 2022/0091193 A1* | 3/2022 | Kwon | G01R 31/54 |

FOREIGN PATENT DOCUMENTS

| | | |
|---|---|---|
| KR | 10-0534697 | 12/2005 |
| KR | 10-1500146 | 3/2015 |

\* cited by examiner

*Primary Examiner* — Jared Fureman
*Assistant Examiner* — Aqeel H Bukhari
(74) *Attorney, Agent, or Firm* — Morgan, Lewis & Bockius LLP

(57) ABSTRACT

A power supply device includes: a low-voltage direct current-direct current converter (LDC) to convert a voltage of a high-voltage battery to supply power; a first low-voltage battery to be charged by receiving power from the LDC and supply power to a general load; a bidirectional converter to convert a voltage supplied from the LDC and control a charge amount of a second low-voltage battery; the second low-voltage battery to be charged by receiving power from the bidirectional converter and supply power to a dual power source load; a first relay disposed between the LDC and the first low-voltage battery; a second relay disposed between the bidirectional converter and the second low-voltage battery; a second battery sensor to measure a voltage of the second low-voltage battery; and a control unit to control the bidirectional converter.

19 Claims, 3 Drawing Sheets

BIDIRECTIONAL CONVERTER AND CONTROL METHOD THEREOF

CROSS-REFERENCE TO RELATED APPLICATION(S)

The present application claims priority to Korean Patent Application No. 10-2022-0105689, filed on Aug. 23, 2022, the entire contents of which is incorporated herein for all purposes by this reference.

BACKGROUND OF THE PRESENT DISCLOSURE

Field of the Present Disclosure

The present disclosure relates to a bidirectional converter and a method for controlling the same, and more specifically, to a bidirectional converter and a control method thereof, wherein an output value of the converter is controlled according to a state of charge (SOC) value of an auxiliary battery in a dual power source structure.

Description of Related Art

Recently, with increasing interest in the environment, the number of eco-friendly vehicles having an electric motor as a power source has increased. An eco-friendly vehicle is also referred to as an electrified vehicle, and may include a hybrid electric vehicle (HEV) or an electric vehicle (EV) as a representative example.

To increase convenience in such an eco-friendly vehicle, a vehicle in which a 12V auxiliary battery is added to the existing 12V main battery has been developed for loads (for example, over the air (OTA), a built-in cam, an airbag control unit (ACU), etc.) requiring application of dual power sources of a 12V system. In such a system using two 12V batteries, to prevent mutual charging and discharging due to a voltage difference between a 12V main battery and a 12V auxiliary battery, a bidirectional converter has been applied between the main battery and the auxiliary battery.

However, in a system to which the conventional bidirectional converter is applied, a low-voltage direct current-direct current converter (LDC) and a bidirectional converter are separately controlled without considering output efficiency of the LDC, so that the LDC operation efficiency is degraded, to lower the fuel efficiency of a vehicle.

Accordingly, in the present field of the present disclosure, a technology capable of controlling a bidirectional converter in consideration of output efficiency of an LDC is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a bidirectional converter in consideration of output efficiency of an LDC, and a control method thereof.

Another aspect of the present disclosure is to provide a bidirectional converter and a control method thereof, the bidirectional converter being configured for operating an LDC at a maximum efficiency point by adding or subtracting a difference between LDC output and the maximum efficiency point to or from an output command of the bidirectional converter.

Yet another aspect of the present disclosure is to provide a bidirectional converter and a control method thereof, the bidirectional converter being configured for improving energy efficiency by increasing the time during which an LDC operates at a maximum efficiency point.

The technical subjects pursued in the present disclosure may not be limited to the above-mentioned technical subjects, and other technical subjects which are not mentioned may be clearly understood, through the following descriptions, by those skilled in the art to which the present disclosure pertains.

A power supply device according to an exemplary embodiment of the present disclosure for solving the above problems includes: a low-voltage direct current-direct current converter (LDC) configured to convert a voltage of a high-voltage battery to supply power; a first low-voltage battery configured to be charged by receiving the power from the LDC and supply power to a predetermined load; a bidirectional converter configured to convert a voltage supplied from the LDC and control a charge amount of a second low-voltage battery; the second low-voltage battery configured to be charged by receiving power from the bidirectional converter and supply power to a dual power source load; a first relay disposed between the LDC and the first low-voltage battery; a second relay disposed between the bidirectional converter and the second low-voltage battery; a battery sensor configured to measure a voltage of the second low-voltage battery; and a control unit configured to control the bidirectional converter.

An output of the bidirectional converter may be controlled according to a result of comparing an output current of the LDC and a maximum efficiency current value of the LDC.

When the output current of the LDC exceeds the maximum efficiency current value, the control unit may reduce an output command of the bidirectional converter.

The control unit may reduce the output command of the bidirectional converter by a value obtained by subtracting the maximum efficiency current value from the output current of the LDC.

The control unit may configure the output command of the bidirectional converter as a value limited to be greater than or equal to a lower limit value.

The lower limit value may be configured based on a maximum discharge power of the second low-voltage battery.

When the output current of the LDC does not exceed the maximum efficiency current value, the control unit may increase the output command of the bidirectional converter.

The control unit may increase the output command of the bidirectional converter by a value obtained by subtracting the output current of the LDC from the maximum efficiency current value.

The control unit may configure the output command of the bidirectional converter as a value limited to be less than or equal to an upper limit value.

The upper limit value may be configured based on a maximum charging power of the second low-voltage battery.

Furthermore, a power supply method according to an exemplary embodiment of the present disclosure includes: driving a bidirectional converter; determining whether a state of charge (SOC) value of an auxiliary battery exceeds a preconfigured first threshold value; when the SOC value of the auxiliary battery exceeds the first threshold value, determining whether an output current of a low-voltage direct current-direct current converter (LDC) exceeds a maximum efficiency current value of the LDC; and controlling an output of the bidirectional converter according to a result of comparing the output current of the LDC with the maximum efficiency current value.

The power supply method may further include reducing an output command of the bidirectional converter when the output current of the LDC exceeds the maximum efficiency current value.

The reducing of the output command may include reducing the output command of the bidirectional converter by a value obtained by subtracting the maximum efficiency current value from the output current of the LDC.

The reducing of the output command may include configuring the output command of the bidirectional converter as a value limited to be greater than or equal to a lower limit value.

The lower limit value may be configured based on a maximum discharge power of the second low-voltage battery.

The power supply method may further include increasing the output command of the bidirectional converter when the output current of the LDC does not exceed the maximum efficiency current value.

The increasing of the output command may include increasing the output command of the bidirectional converter by a value obtained by subtracting the output current of the LDC from the maximum efficiency current value.

The increasing of the output command may include configuring the output command of the bidirectional converter as a value limited to be less than or equal to an upper limit value.

The upper limit value may be configured based on a maximum charging power of the second low-voltage battery.

According to various embodiments of the present disclosure as described above, energy efficiency may be improved by maximizing the time during which an LDC operates at a maximum efficiency point.

Furthermore, durability may be improved by determining whether to charge a battery according to a state of charge (SOC) value of the battery.

Advantageous effects obtainable from the present disclosure may not be limited to the above-mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
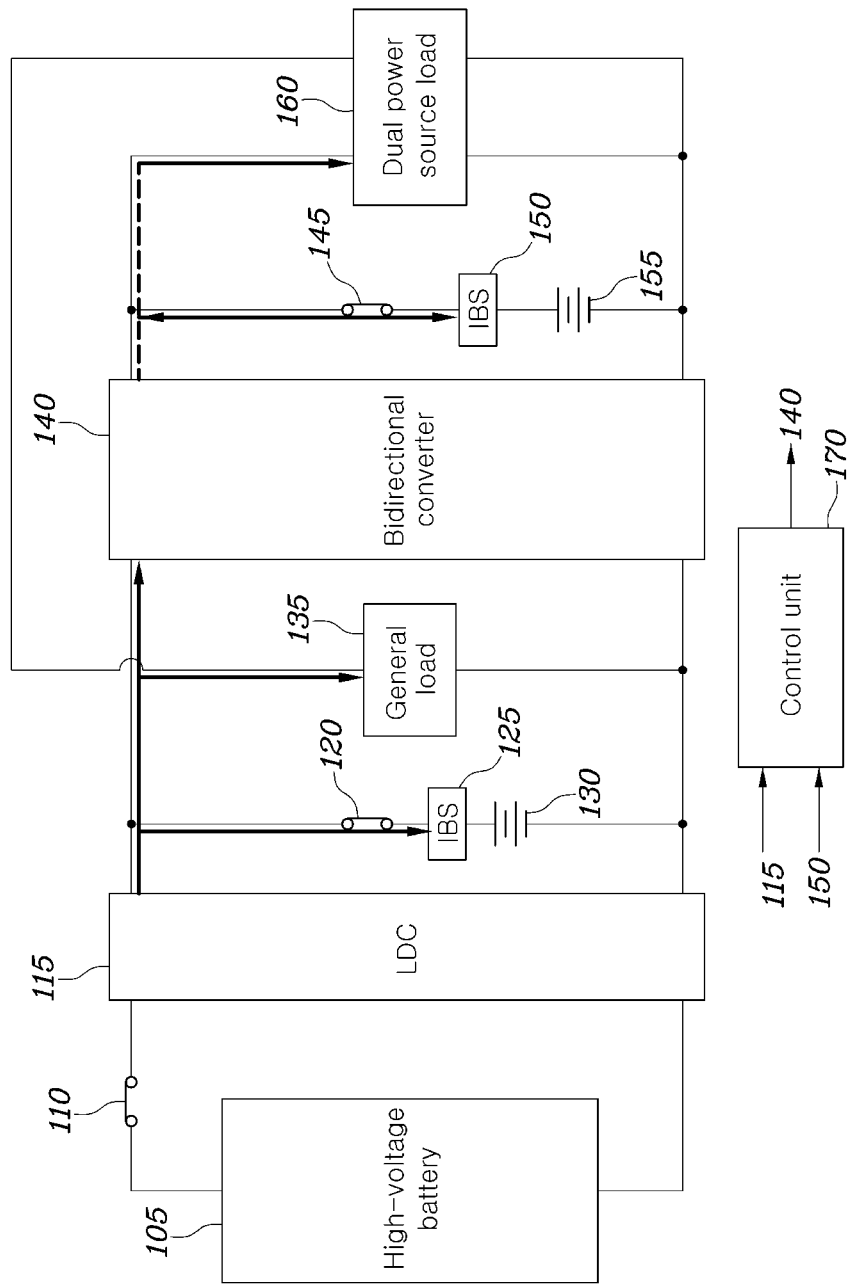
FIG. 1 shows a power supply device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted. The terms "module" and "unit" used for the elements in the following description are provided or interchangeably used in consideration of only the ease of writing the specification, and do not have distinct meanings or roles by themselves. In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it may be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

In the present specification, dual power sources correspond to a power supply method of supplying power to a load by use of two power sources independent of each other to safely supply power, and a dual power source load refers to a load configured to receive power from two power sources independent of each other.

FIG. 1 shows a power supply device according to an exemplary embodiment of the present disclosure.

Referring to FIG. 1, a power supply device according to the exemplary embodiment includes a high-voltage battery 105, a first relay 110, a low-voltage direct current-direct current converter (LDC) 115, a second relay 120, a first battery sensor 125, a first low-voltage battery 130, a general load 135, a bidirectional converter 140, a third relay 145, a second battery sensor 150, a second low-voltage battery 155, a dual power source load 160, and a control unit 170.

A high voltage higher than 12V, for example, 42V, is supplied to chassis and motors which require high power in general vehicles, to increase power efficiency, and low-power devices of electronic components use the existing 12V power system.

Accordingly, the high-voltage battery 105 may be a battery which supplies a voltage higher than 12V, for example, 42V, and the first and second low-voltage batteries 130 and 155 may be batteries which supply a voltage of 12V.

The high-voltage battery 105 charges the first and second low-voltage batteries 130 and 155 through the LDC 115, and supplies power for driving the general load 135 and the dual power source load 160.

The first relay 110 is configured to control power supply from the high-voltage battery 105 to the LDC 115.

The low-voltage direct current-direct current converter (LDC) 115 converts a voltage of the high-voltage battery 105.

The second relay 120 is configured to control charging and discharging of the first low-voltage battery 130, and the third relay 145 is configured to control charging and discharging of the second low-voltage battery 155.

The first battery sensor 125 measures a voltage, a current, and a state of charge (SOC) value of the first low-voltage battery 130.

The first low-voltage battery 130 is charged at a low voltage converted by the LDC 115, and supplies power to the general load 135.

The general load 135 operates by receiving power from the LDC 115 or the first low-voltage battery 130.

The first low-voltage battery 130 among the low-voltage batteries 130 and 155 may preferentially supply power to the general load 135 and the dual power source load 160 while a vehicle's engine is turned on, and operate as a main battery which stops supplying power when the vehicle's engine is turned off.

The second low-voltage battery 155 may operate as an auxiliary battery which supplies power to some components when the charged power remains at a predetermined level or more even when the vehicle's engine is turned off.

The general load 135 is configured to operate by receiving power from the LDC 115 or the first low-voltage battery 130 which interrupts power supply when the vehicle's engine is turned off, and thus stops operating when the vehicle's engine is turned off.

The bidirectional converter 140 converts a voltage supplied from the LDC 115, and is configured to control a charge amount of the second low-voltage battery 155.

The third relay 145 is configured to control charging and discharging of the second low-voltage battery 155.

The second battery sensor 150 measures a voltage, a current, and a state of charge (SOC) value of the second low-voltage battery 155.

The second low-voltage battery 155 is charged at a low voltage converted by the bidirectional converter 140, and supplies power to the dual power source load 160.

Output voltages of the first and second low-voltage batteries 130 and 155 may be 12V.

The dual power source load 160 operates by receiving power from the bidirectional converter 140 or the second low-voltage battery 155.

The dual power source load 160 is a load requiring power supply even when the vehicle's engine is off, and is configured to operate by receiving power from the bidirectional converter 140 or the second low-voltage battery 155, and is thus able to keep on operating by receiving power from the second low-voltage battery 155 while the power of the second low-voltage battery 155 remains at a predetermined level or more even when the vehicle's engine is turned off.

The control unit 170 may receive a voltage, a current, and a state of charge (SOC) value of the second low-voltage battery 155 from the second battery sensor 150 or an output current of the LDC 115, and accordingly, control the bidirectional converter 140 to charge the second low-voltage battery 155.

The control unit 170 may include a processor and a memory, and may be implemented by a hybrid control unit (HCU) in the case of a hybrid vehicle, and implemented by a vehicle control unit (VCU) in the case of an EV vehicle.

For example, the control unit 170 may drive a bidirectional converter, determine whether a state of charge (SOC) value of an auxiliary battery exceeds a preconfigured first threshold value, determine whether an output current of a low-voltage direct current-direct current converter (LDC) exceeds a maximum efficiency current value of the LDC when the SOC value of the auxiliary battery exceeds the first threshold value, and control an output of the bidirectional converter according to a result of comparing the output current of the LDC with the maximum efficiency current value.

A detailed operation process of the control unit 170 will be described in detail with reference to FIG. 3 and the related description below.

In the power supply device as shown in FIG. 1, the power efficiency of the LDC 115 increases as an output current of the LDC increases until the output current reaches a predetermined level, and when the output current exceeds the predetermined level, the power efficiency decreases as the output current increases. Therefore, if, when the output current of the LDC 115 is lower than a maximum efficiency current, the output current is increased, and when the output current of the LDC 115 is higher than the maximum efficiency current, the output current is reduced, the power efficiency of the LDC 115 may be maximized. In the instant case, the output current of the LDC 115 may be controlled to be optimized by controlling the output of the bidirectional converter 140.

Figure 2:
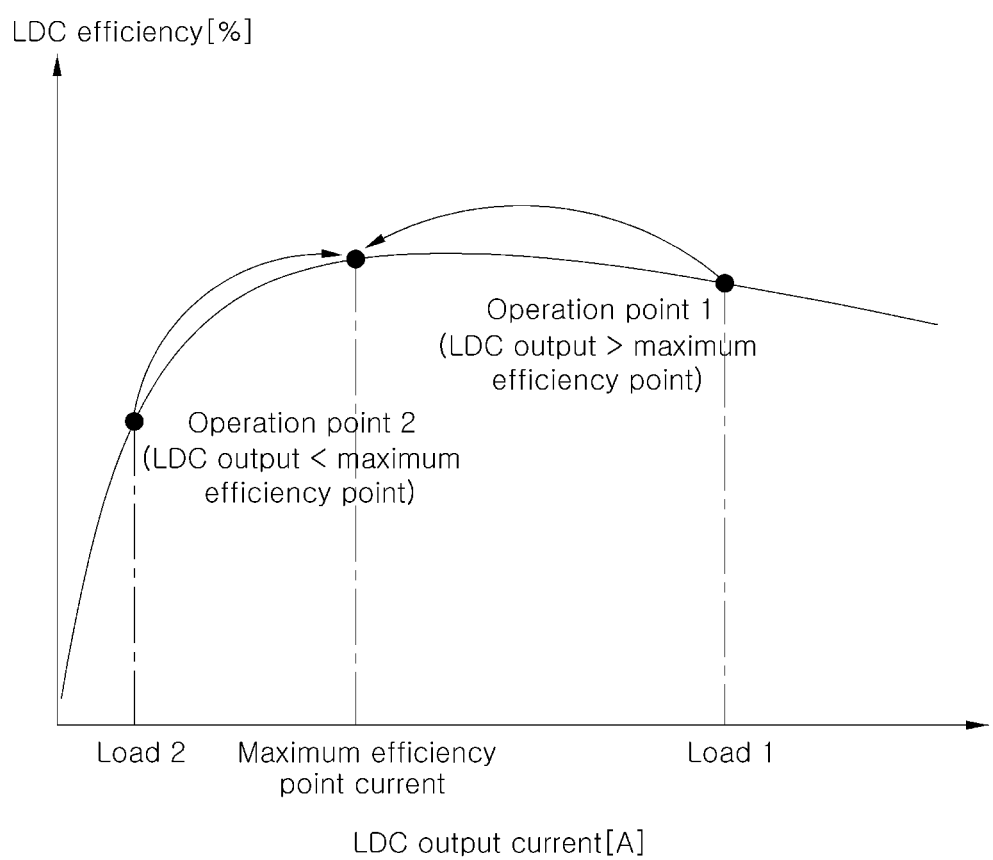
FIG. 2 is a graph showing the correlation between an output current of an LDC and LDC efficiency.

FIG. 2 is a graph showing the correlation between an output current of an LDC and LDC efficiency.

Referring to FIG. 2, it may be seen that the efficiency of the LDC increases as an LDC output current increases when the LDC output current is less than an LDC maximum efficiency point current and the efficiency of the LDC decreases as the LDC output current increases when the LDC output current is greater than the LDC maximum efficiency point current. When the LDC output current is in load 1, the LDC output current is moved from the load 1 to the maximum efficiency point current, so that the LDC efficiency may be increased from operation point 1 to the LDC efficiency of a maximum efficiency point. That is, the LDC efficiency may be increased adjacent to the maximum efficiency by increasing a bidirectional converter output command by (the LDC output current—the maximum efficiency point current).

Furthermore, when the LDC output current is in load 2, the LDC output current is moved from the load 2 to the maximum efficiency point current, so that the LDC efficiency may be increased from operation point 2 to the LDC efficiency of the maximum efficiency point. That is, the LDC efficiency may be increased adjacent to the maximum efficiency by reducing the bidirectional converter output command by (the maximum efficiency point current—the LDC output current).

Figure 3:
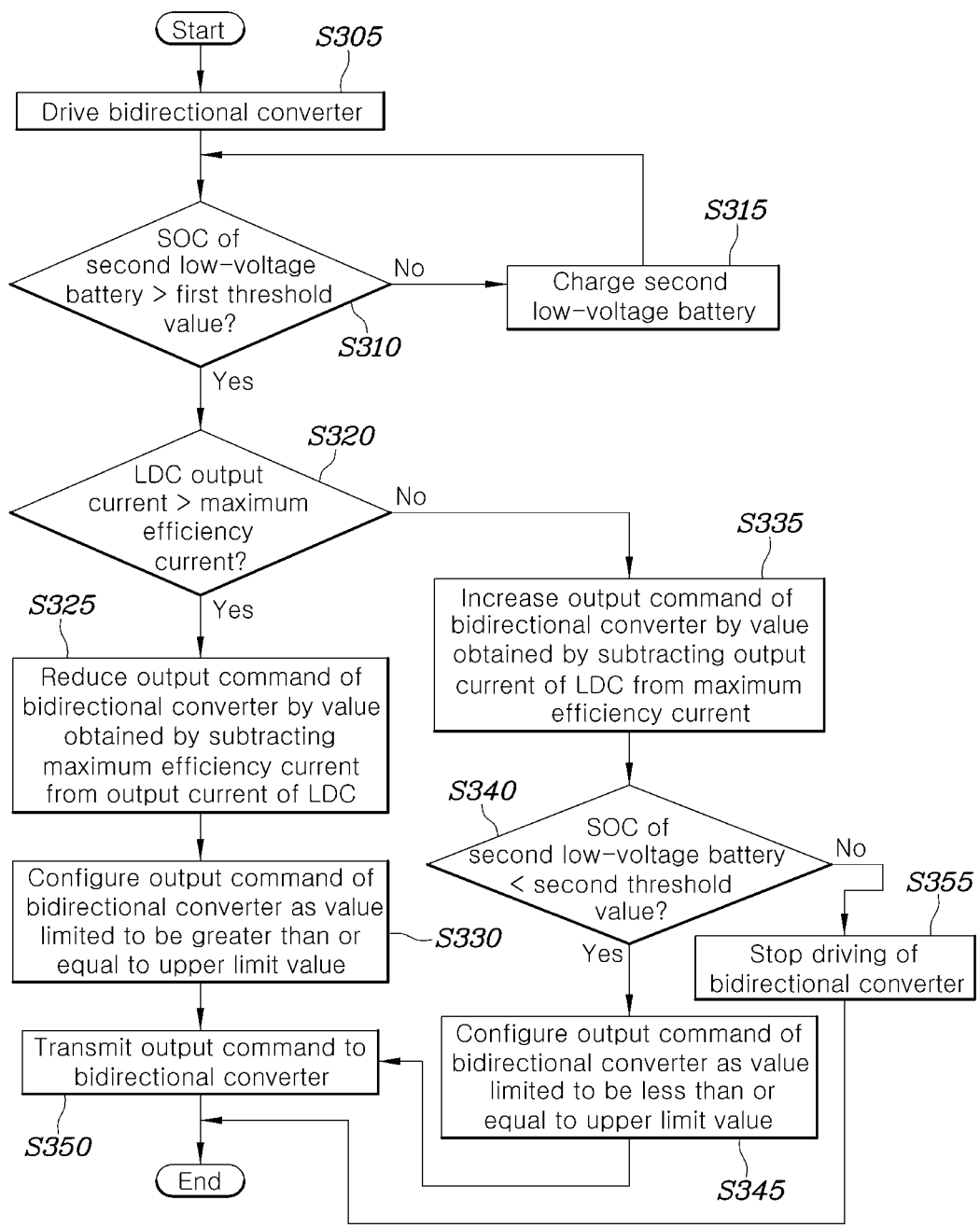
FIG. 3 is a flowchart showing a method of controlling a bidirectional converter according to an exemplary embodiment of the present disclosure.

FIG. 3 is a flowchart showing a method of controlling a bidirectional converter according to an exemplary embodiment of the present disclosure. The control of a bidirectional converter according to the exemplary embodiment may be performed by the control unit 170. The control unit 170 may receive a voltage, a current, and a state of charge (SOC) value of the second low-voltage battery 155 from the second battery sensor 150 or an output current of the LDC 115, and accordingly, control the bidirectional converter 140 to charge the second low-voltage battery 155.

Referring to FIG. 3, when the LDC 115 operates, the control unit 170 drives the bidirectional converter 140 (S305).

The control unit 170 may transmit a driving command signal to the bidirectional converter 140, to drive the bidirectional converter.

Next, the control unit 170 determines whether an SOC value of the second low-voltage battery 155 exceeds a preconfigured first threshold value (S310).

The SOC value of the second low-voltage battery 155 may be measured by the second battery sensor 150 and transmitted to the control unit in real time.

For example, the preconfigured threshold value may be configured to be 95%.

When the SOC value of the second low-voltage battery 155 does not exceed the preconfigured first threshold value as a result of the determination in operation S310, the control unit is configured to control the bidirectional converter to charge the second low-voltage battery 155 (S315).

Meanwhile, when the SOC value of the second low-voltage battery 155 exceeds the first threshold value as a result of the determination in operation S310, the control unit is configured to determine whether an output current of the LDC 115 exceeds a maximum efficiency current value (S320), and when the output current of the LDC 115 exceeds the maximum efficiency current value, the control unit is configured to reduce an output command of the bidirectional converter 140 by a value obtained by subtracting the maximum efficiency current value from the output current of the LDC 115 (S325). That is, the output command of the bidirectional converter is configured to satisfy Equation 1 below.

Output command of bidirectional converter=previous output command of bidirectional converter−(output current of LDC−maximum efficiency current of LDC)     [Equation 1]

The control unit configures the output command of the bidirectional converter 140 as a value limited to be greater than or equal to a lower limit value (S330), and transmits the output command to the bidirectional converter (S350).

While a lower limit value of the output command of the bidirectional converter 140 is a maximum discharge power of the second low-voltage battery 155, the control unit 170 configures the output command of the bidirectional converter 140 as the value limited to be greater than or equal to the lower limit value (S330), and transmits the output command to the bidirectional converter (S350).

The lower limit value of the output command of the bidirectional converter 140 may be configured based on the maximum discharge power of the second low-voltage battery 155.

When the output command of the bidirectional converter 140 is configured to be too low as a result of subtracting the output command of the bidirectional converter 140 in operation S325, the second low-voltage battery 155 may be discharged at a faster rate than a rate at which the second low-voltage battery 155 is charged from the bidirectional converter 140.

Accordingly, the control unit 170 configures the lower limit value of the output command of the bidirectional converter 140 so that an output power of the bidirectional converter 140 does not become lower than the maximum discharge power of the second low-voltage battery 155.

When the output current of the LDC 115 does not exceed the maximum efficiency current value as a result of the determination in operation S320, the control unit 170 increases the output command of the bidirectional converter 140 by a value obtained by subtracting the output current of the LDC 115 from the maximum efficiency current value of the LDC 115 (S335). That is, the output command of the bidirectional converter is configured to satisfy Equation 2 below.

Output command of bidirectional converter=previous output command of bidirectional converter+(maximum efficiency current of LDC−output current of LDC)     [Equation 2]

Next, the control unit 170 determines whether the SOC value of the second low-voltage battery 155 is less than a preconfigured second threshold value (S340), when the SOC value of the second low-voltage battery 155 is less than the second threshold value, configures the output command of the bidirectional converter 140 as a value limited to be less than or equal to an upper limit value (S345), and transmits the output command to the bidirectional converter 140 (S350).

When the output command of the bidirectional converter 140 is configured to be too high as a result of increasing the output command of the bidirectional converter 140 in operation S340, the output power of the bidirectional converter 140 exceeds a maximum charging power of the second low-voltage battery 155, and thus unnecessary power may be continuously supplied to the second low-voltage battery 155.

Therefore, to prevent power to be wasted by continuously supplying unnecessary power to the second low-voltage battery 155, the control unit 170 configures an upper limit value of the output command of the bidirectional converter 140 so that the output power of the bidirectional converter 140 does not exceed the maximum charging power of the second low-voltage battery 155.

When the SOC value of the second low-voltage battery 155 is not less than the second threshold value as a result of the determination in operation S340, the control unit stops the driving of the bidirectional converter 140 (S355).

The control unit 170 may transmit a driving stop command signal to the bidirectional converter 140, to stop the driving of the bidirectional converter.

According to the exemplary embodiments of the present disclosure described so far, energy efficiency may be improved by maximizing the time during which the LDC operates at a maximum efficiency point.

Furthermore, durability may be improved by determining whether to charge a battery according to a state of charge (SOC) value of the battery.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power supply apparatus comprising:
a low-voltage direct current-direct current converter (LDC) configured to convert a voltage of a high-voltage battery to supply power;
a first low-voltage battery configured to be charged by receiving the power from the LDC and supply power to a predetermined load;
a bidirectional converter configured to convert a voltage supplied from the LDC and control a charge amount of a second low-voltage battery;
the second low-voltage battery configured to be charged by receiving power from the bidirectional converter and supply power to a dual power source load;
a first relay disposed between the LDC and the first low-voltage battery;
a second relay disposed between the bidirectional converter and the second low-voltage battery;
a battery sensor configured to measure a voltage of the second low-voltage battery; and
a control unit configured to control the bidirectional converter to charge the second low-voltage battery.

2. The apparatus of claim 1, wherein an output of the bidirectional converter is controlled according to a result of comparing an output current of the LDC with a maximum efficiency current value of the LDC.

3. The apparatus of claim 2, wherein the control unit is configured to reduce an output command of the bidirectional converter when the output current of the LDC exceeds the maximum efficiency current value.

4. The apparatus of claim 3, wherein the control unit is configured to reduce the output command of the bidirectional converter by a value obtained by subtracting the maximum efficiency current value from the output current of the LDC.

5. The apparatus of claim 3, wherein the control unit is configured to configure the output command of the bidirectional converter as a value limited to be greater than or equal to a lower limit value.

6. The apparatus of claim 5, wherein the lower limit value is configured based on a maximum discharge power of the second low-voltage battery.

7. The apparatus of claim 2, wherein the control unit is configured to increase an output command of the bidirectional converter when the output current of the LDC does not exceed the maximum efficiency current value.

8. The apparatus of claim 7, wherein the control unit is configured to increase the output command of the bidirectional converter by a value obtained by subtracting the output current of the LDC from the maximum efficiency current value.

9. The apparatus of claim 7, wherein the control unit is configured to configure the output command of the bidirectional converter as a value limited to be less than or equal to an upper limit value.

10. The apparatus of claim 9, wherein the upper limit value is configured based on a maximum charging power of the second low-voltage battery.

11. A power supply method comprising:
driving a bidirectional converter;
determining, by a control unit, whether a state of charge (SOC) value of an auxiliary battery exceeds a preconfigured first threshold value;
when the SOC value of the auxiliary battery exceeds the first threshold value, determining, by the control unit, whether an output current of a low-voltage direct current-direct current converter (LDC) exceeds a maximum efficiency current value of the LDC; and
controlling, by the control unit, an output of the bidirectional converter according to a result of comparing the output current of the LDC with the maximum efficiency current value to charge the auxiliary battery.

12. The method of claim 11, further including reducing an output command of the bidirectional converter when the output current of the LDC exceeds the maximum efficiency current value.

13. The method of claim 12, wherein the reducing of the output command includes reducing the output command of the bidirectional converter by a value obtained by subtracting the maximum efficiency current value from the output current of the LDC.

14. The method of claim 13, wherein the reducing of the output command further includes configuring the output command of the bidirectional converter as a value limited to be greater than or equal to a lower limit value.

15. The method of claim 14, wherein the lower limit value is configured based on a maximum discharge power of the second low-voltage battery.

16. The method of claim 11, further including increasing an output command of the bidirectional converter when the output current of the LDC does not exceed the maximum efficiency current value.

17. The method of claim 16, wherein the increasing of the output command includes increasing the output command of the bidirectional converter by a value obtained by subtracting the output current of the LDC from the maximum efficiency current value.

18. The method of claim 17, wherein the increasing of the output command further includes configuring the output command of the bidirectional converter as a value limited to be less than or equal to an upper limit value.

19. The method of claim 18, wherein the upper limit value is configured based on a maximum charging power of the second low-voltage battery.

* * * * *